Jan. 2, 1923.

C. F. WASSERFALLEN.
SPARE WHEEL BRACKET.
FILED OCT. 29, 1917.

Witness
Charles Baly
Arthur F. Draper

Inventor
Charles F. Wasserfallen
By
Attorney

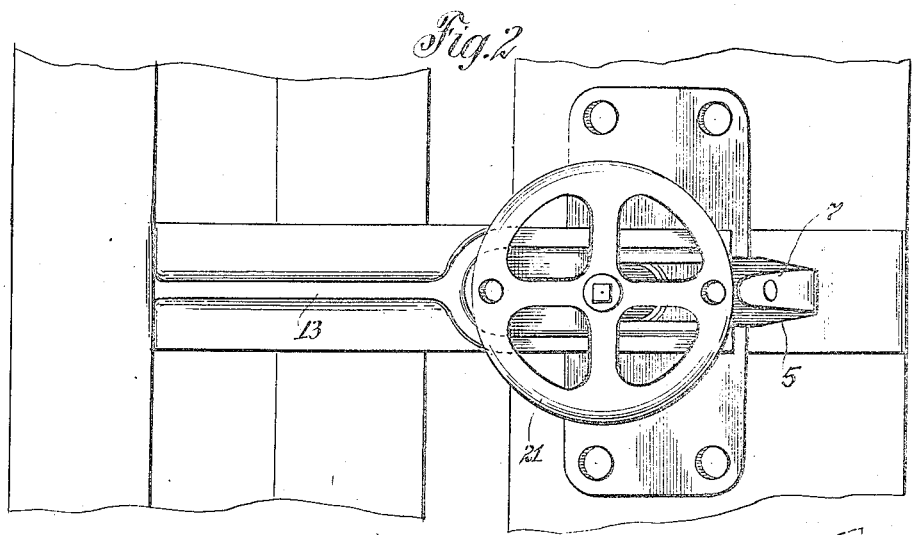
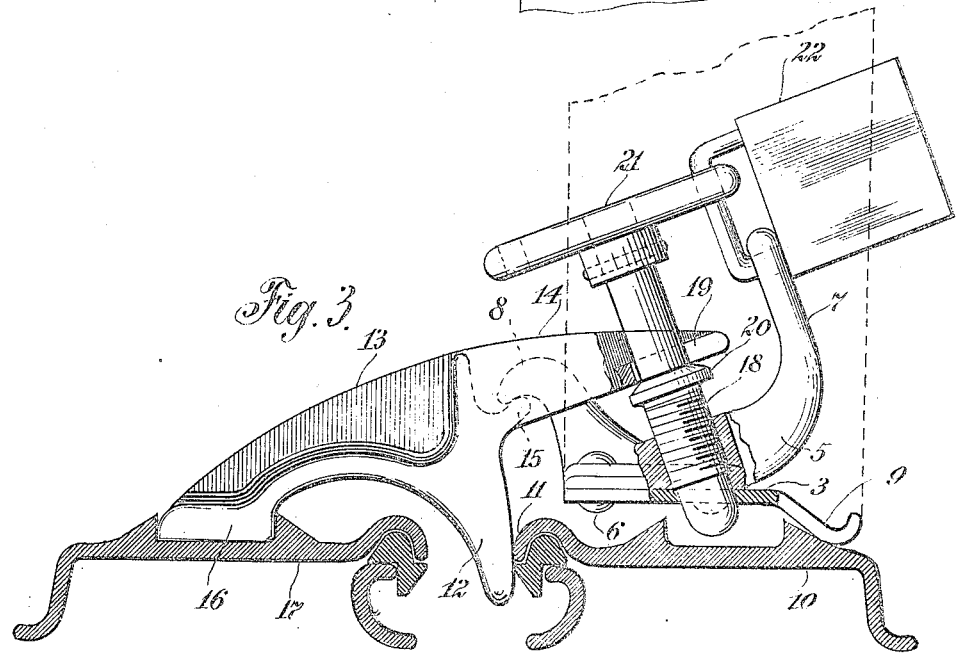

Patented Jan. 2, 1923.

1,441,189

UNITED STATES PATENT OFFICE.

CHARLES F. WASSERFALLEN, OF DETROIT, MICHIGAN, ASSIGNOR TO DETROIT TIRE CARRIER CO., OF DETROIT, MICHIGAN, A CORPORATION OF MICHIGAN.

SPARE-WHEEL BRACKET.

Application filed October 29, 1917. Serial No. 199,153.

*To all whom it may concern:*

Be it known that I, CHARLES F. WASSERFALLEN, a citizen of the United States of America, residing at Detroit, in the county of Wayne and State of Michigan, have invented certain new and useful Improvements in Spare-Wheel Brackets, of which the following is a specification, reference being had therein to the accompanying drawings.

This invention relates to spare wheel holding means for automobiles and to an arrangement thereof whereby an extra tire rim or wheel may be secured to the regular spare tire or wheel and rigidly held in such manner as to preclude rattling. The device also provides a lock to prevent removal or molestation.

The invention consists in the matters hereinafter set forth, and more particularly pointed out in the appended claims.

In the drawings,

Fig. 2 is a plan view of the device itself, and

Fig. 3 is a view, partially in elevation and partially in section thereof.

Figure 1:
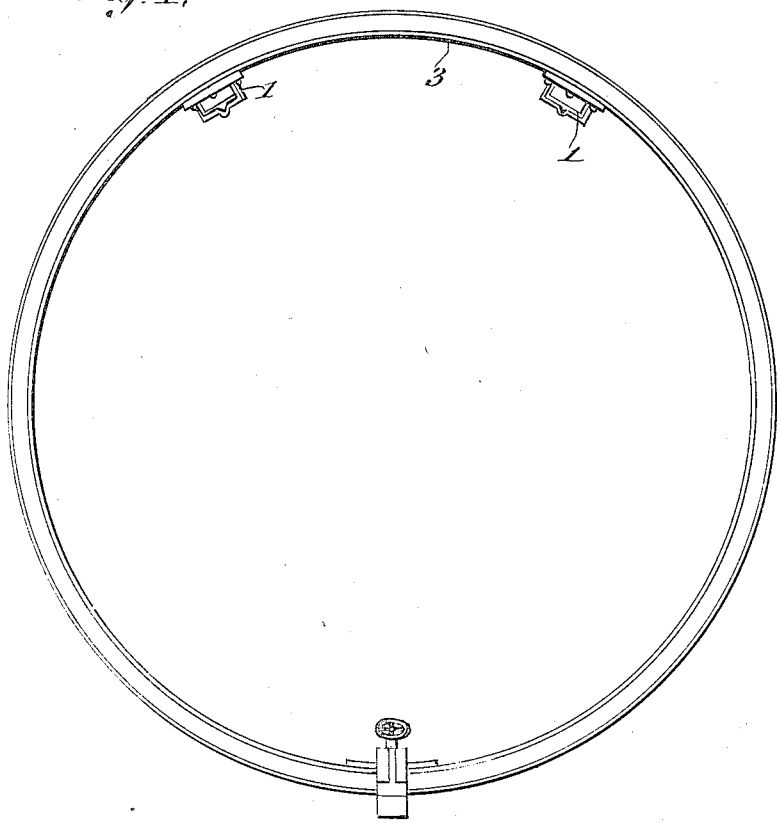
Figure 1 is a view in elevation of a spare tire or wheel holder of approved type equipped with a device for supporting a second rim or spare wheel thereon and locking the same in position.

The present invention is of the general type of that disclosed in my companion application forming the subject-matter of Patent No. 1,279,801, dated September 24, 1918, in that provision is made to carry either a single spare tire or rim or a pair of such tires or rims at will, the first tire or rim being carried on the well-known commercial felloe band—indicated at 3—of slightly smaller external diameter than the internal diameter of the rim to be positioned thereon, the second tire or rim being supported on brackets 1 carried by the band 3 at spaced-apart points at the top of the band. The tires or rims are secured in position by a third instrumentality located substantially opposite the brackets 1, the instrumentality being arranged in such manner that the first rim—which must, by reason of the form of the felloe band, be applied by movement more or less in the direction of the rim axis—may be readily placed in position for securing purposes and in advance of the positioning of the second tire or rim, where the latter is being carried. This action is present both in the earlier construction and that disclosed herein, and in each provision is made for securing the single tire in position by the instrumentality when but the single tire or rim is being carried, or for securing both tires or rims in their proper positions and through the action of the instrumentality, when the pair of tires or rims are being carried.

For the purpose of explanation the term "rim" will be employed as referring to the bare rim or a rim carrying a tire; and since the tire may be carried without the rim—where the tire is of a special form, for instance—the term "rim" is intended to include such arrangement as well.

The brackets 1 may be of the removable type shown in the earlier construction, if desired.

The present construction differs from that of the patent referred to mainly in the formation of the clamping instrumentality opposite the brackets 1, the present construction having the characteristic of the earlier construction in that one of the members of the instrumentality is not active when a second rim is not carried—and may be taken off and placed in the tool box, if desired; also in the characteristic that during positioning of the two rims, one rim becomes active as a part of the instrumentality to properly position both rims in proper relation to each other and to the instrumentality. In the present invention these characteristics are produced in a different manner from that of the patent disclosure, the following description indicating the construction and operation of the instrumentality of the present invention.

5 indicates a fixed member secured, as by rivets 6, to the inside of the felloe band 3, the member having a hook-shaped portion 8 extending inwardly—with respect to the diameter of the band—and outwardly with respect to the outer edge of the band, the portion projecting in the opposite direction and on the opposite edge of the band from that on which the usual flange 9 of the band extends, the flange being considered as the inner edge of the band in the present description. Member 5 also carries a locking lug 7 presently referred to.

Member 5 carries a threaded opening to receive the threaded stem 18 of an operating member, the latter having a smooth end adapted to extend through an opening in the felloe band alined with the threaded opening in member 5. This smooth end of the operating member is adapted to engage the inner periphery of the applied rim when but the single rim is being carried. For instance, in Fig. 3, if rim 10 alone is to be carried, movement of the operating member by its hand-wheel 21, in the direction to advance the member outwardly in the openings, will carry the smooth end of the element into contact with the rim and thus secure the latter in position; this places the smooth end within the channel formation shown in connection with this type of rim. When in this position a padlock 22 may be applied to lug 7 and the hand-wheel to prevent rotation of the latter and thus secure the rim in locked position.

When it is desired to remove the rim, the lock is removed, wheel 21 rotated in the reverse direction to free the rim, after which the latter can be readily taken off.

For the purpose of securing a pair of rims in position an additional member, which may be termed a clamp, is employed, this being indicated at 13. Member 13 is preferably of the form shown, being provided with a bifurcated inner end 19 adapted to straddle the shank of the operating member above flange 20—preferably bevelled; the outer end of the member is provided with a toe 16 adapted to enter the channel of the second rim 17; member 13 is also provided with an ear 15 positioned and shaped to cooperate with the under face of hook-portion 8—said portion being of recess characteristic to present the characteristics of a bearing face; and the member additionally carries a projecting portion or tongue 12.

In the absence of the second tire or rim, member 13 is useless and practically unsupportable in the instrumentality; it is preferably carried in the tool box or otherwise at such time. When, however, the second tire is in position and supported on brackets 1, member or clamp 13 is positioned with tongue 12 between the rims, ear 15 beneath the hook portion, end 19 straddling the operating member, and toe 16 above the channel of rim 17. This position can be readily obtained as will be understood from Fig. 3; assuming the operating member to be moved so as to have the advance or smooth end projecting into the channel of the first rim, sufficient play of the parts is permitted to allow the clamp to be placed in position.

With the clamp in such position it will be understood that two fulcruming points are present—one between tongue 12 and the portion 11 of the first rim, and the other between ear 15 and the bearing face of portion 8. In securing the rims in position, these points generally become active successively, due to the fact that rims vary slightly in dimensions. This will be understood from the following:

With the clamp in position between the two rims, the wheel 21 is turned in the direction to withdraw the advance end away from the first rim—releasing the latter if it had previously been engaged; this movement causes flange 20 to raise the inner end of member 13, the latter rocking at the fulcrum point provided by ear 15, and moving tongue 12 in the direction to move the first rim into position against flange 9, this movement continuing until the resistance to rim movement becomes sufficiently great to exceed the power applied by the flange 20, whereupon further movement of the tongue ceases, and the tongue becomes the fulcrum—through contact with rim 10, and further power application by flange 20 causes ear 15 to move along the bearing face of portion 8, thus rocking the member to bring toe 16 into clamping position relative to rim 17.

As will be understood, the extent of movement of member 13 or the time and order of activity of the two fulcrum points will depend more or less upon the dimensions of the rims, the width and diameter of rim 10 determining the time when tongue 12 becomes the fulcrum, and the diameter of rim 17 determining the extent of movement of ear 15. This flexibility is of advantage, since it will be understood that if the limit of advancing movement of tongue 12 be reached in advance of toe 16 reaching its clamping position—assuming only a pivot movement at the point of ear 15—tire 17 would not be clamped; or if toe 16 engaged rim 17 before tongue 12 had moved the first rim to position—assuming the pivot conditions at ear 15—the first rim would not be positively clamped. Because of the variations in rim dimensions either of these conditions might be present if ear 15 were arranged as a true pivot; since, however, the arrangement is such as to give ear 15 the characteristics of a movable pivot, it is possible—through this shifting of fulcrum points—to take care of these rim variations, so that no particular care need be taken in selecting rims for application to the carrier.

As will be understood, both rims become firmly clamped in position when the operating member has brought toe 16 into firm contact with rim 17, and the padlock 22 can be applied, thus preventing rotation of the operating member, a condition that maintains the position of the parts regardless of road or service conditions, it being necessary to render parts useless by breaking to permit accidental release. Since the rims are firmly clamped, there is no rattling or working loose of the parts in service, while the presence of the lock 22 maintains the locked condition.

While I have shown a preferred arrangement of parts, it will be understood that changes or modifications therein may be found desirable or essential to meet the various exigencies of use, and I desire to be understood as reserving the right to make any and all such changes or modifications therein as may be found desirable or necessary, in so far as the same may fall within the spirit or scope of the invention as expressed in the accompanying claims when broadly construed.

What I claim is:—

1. In a tire or rim carrier, wherein a single rim or a pair of rims may be carried at will, and wherein the first rim is supported by a permanently-positioned felloe band formation and the second rim supported by a pair of brackets carried by the felloe band at spaced-apart points, means located substantially opposite said brackets for clamping the supported rim or rims, said means including a pair of movable members, one of said members being independently operative to clamp the first rim in position when the single rim is being carried and operative by its movement to render the other member active as a clamping element when both rims are being carried.

2. A carrier as in claim 1 characterized in that the first member is operative to clamp the first rim by direct contact therewith, said contact being eliminated by member shifting movement when the second rim is being carried.

3. A carrier as in claim 1 characterized in that the movement of the first member in clamping one rim in position is opposite to that present when both rims are being clamped.

4. A carrier as in claim 1 characterized in that the second member is removable bodily when but a single rim is being carried, the member being free from supporting engagement in the means assembly in the absence of the second rim.

5. In a tire or rim carrier, wherein a single rim or a pair of rims may be carried at will, and wherein the first rim is supported by a permanently-positioned felloe band formation and the second rim supported by a pair of brackets carried by the felloe-band at spaced-apart points, means located substantially opposite said brackets for clamping the supported rim or rims, said means including a member permanently secured to the band, and an element movable relative to said member in opposite directions, the movement of the element in one direction being operative to clamp the first rim in position, the movement in the opposite direction being operative in clamping both rims in position.

6. A carrier as in claim 5 characterized in that the element and member have a threaded relation, whereby the opposing movements will be had by threading movements of the element.

7. A carrier as in claim 5 characterized in that the element and member have a threaded relation with the element having a portion in advance of the threaded zone, the advance portion being brought into and out of contact with the first rim by the threading movement of the element.

8. A carrier as in claim 5 characterized in that the element and member have a threaded relation, the member and the element having complemental means to permit positioning of a locking instrumentality in any of the adjusted positions of the element.

9. In a tire or rim carrier adapted to carry a pair of spare rims in spaced-apart relation and in substantial axial alinement, and wherein the first rim is supported by a felloe-band formation and the second rim supported by brackets carried by the rim in spaced-apart relation, means located substantially opposite said brackets for clamping the supported rims, said means including a member adapted to engage both positioned rims and having a formation such as to be movable on two independent fulcrum points during means operation in the clamping of the two rims.

10. A carrier as in claim 9 characterized in that one of the fulcrum points is provided by the movement of the first rim to its clamped position.

11. A carrier as in claim 9 characterized in that one of said fulcrum points is active during the movement of the first rim to its clamping position, the other of said points being rendered active by the positioned first tire to cause movement of the member to clamp the second rim.

12. A carrier as in claim 9 characterized in that one of said fulcrum points is active during the movement of the first rim to its clamping position, the other of said points being rendered active by the positioned first tire to cause movement of the member to clamp the second rim, the latter movement shifting the relative relations of the parts forming the first fulcruming point.

13. In a tire or rim carrier adapted to carry a pair of rims in spaced-apart relation and in substantial axial alinement, and wherein the first rim is supported by a felloe-band formation and the second rim supported by brackets carried by the band in spaced-apart relation, means located substantially opposite said brackets for clamping the supported rims, said means including a member having a tongue adapted to extend between the positioned rims, said tongue being operative to move the first rim to its clamped position during means operation, and also being co-operative with the clamped first rim to form a fulcrum active to cause member engagement with the second rim to clamp the latter in position.

14. A carrier as in claim 13 characterized in that the member also carries an ear independent of the tongue and operative as a fulcrum-point element active during the movement of the first tire to its clamped position.

15. In a tire or rim carrier adapted to carry a pair of rims in spaced-apart relation and in substantial axial alinement, and wherein the first rim is supported by a felloe-band formation and the second rim supported by brackets carried by the band in spaced-apart relation, means located substantially opposite said brackets for clamping the supported rims, said means including a member shiftable in the direction of its axis, and an element supported to engage and actively apply clamping pressure to both positioned rims, said element having its inner end in operative engagement with said member and having independent portions adapted to engage the respective rims, said element also carrying an ear active in the production of a fulcrum point relation during rim movements to clamping position.

16. A carrier as in claim 15 characterized in that the element is bodily removable from the means assembly, with the element mounting such that absence of the second rim frees the element from support in the assembly.

In testimony whereof I affix my signature in the presence of two witnesses.

CHARLES F. WASSERFALLEN.

Witnesses:
G. E. McGRANN,
A. M. DORR.